C. S. MUNROE.
CARBURETER.
APPLICATION FILED SEPT. 6, 1913.
1,098,827.
Patented June 2, 1914.
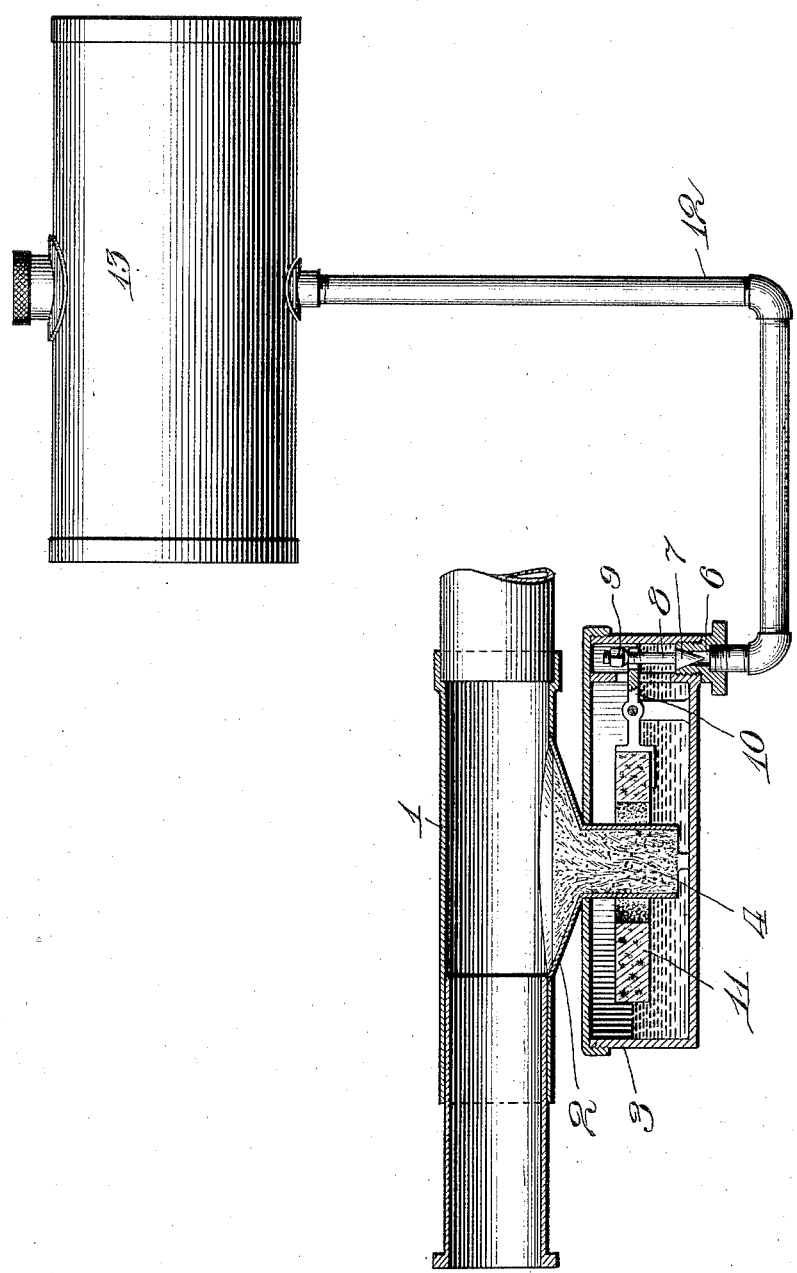

UNITED STATES PATENT OFFICE.

CLYDE S. MUNROE, OF RIVER FOREST, ILLINOIS.

CARBURETER.

1,098,827. Specification of Letters Patent. Patented June 2, 1914.

Application filed September 6, 1913. Serial No. 788,365.

*To all whom it may concern:*

Be it known that I, CLYDE S. MUNROE, a citizen of the United States, and a resident of River Forest, in the county of Cook and State of Illinois, have invented certain new and useful Improvements in Carbureters, of which the following is a specification.

It has been noted by those having familiarity with the operation of internal combustion engines, especially in automobiles, that in damp and especially foggy weather a greater proportion of air, or what amounts to the same thing, a less proportion of gas, may be employed and a much more satisfactory explosion secured.

My present invention has for its object the provision of facilities for moistening the air portion of the charge for internal combustion engines, and also for controlling the amount of such moistening.

I attain the above objects by the structure illustrated in the accompanying drawing which is a central vertical section of my invention.

My invention may be easily attached to the air intake port of any of the carbureters now in use.

It consists essentially of an air supply tube, 1, one end of which is connected to the air intake port of the carbureter, above referred to. An area of the air supply tube, 1, is cut away, and about this opening is secured the top of the funnel shaped well, 2, the lower end of which extends adjacent to the bottom of a float chamber, 3. The funnel shaped well, 2, is filled with a suitable wicking or substance, 4, which will, through capillarity, maintain a moist area in the air supply tube, 1, over which the air reaching the carbureter will have to pass, thereby taking up some moisture. The amount of moisture so taken up will depend either upon the rate of flow of the air through the air supply tube or the extent of the moist area in the air supply tube. As the rate of flow of the air through the air supply tube depends upon the exigencies of the service to which the engine is put, I have provided the sliding sleeve, 5, telescoping into the air supply tube, 1, of such a length that when it is telescoped as far as it will enter the air supply tube, 1, the moist area will be entirely covered and closed. It will be evident that the extent of the moist area, and thereby the amount of moisture imparted to the air, can be determined by withdrawing the sliding sleeve, 5, to a greater or less extent from the air supply tube, 1.

In order to keep the well, 2, and wicking, 4, supplied with a proper amount of moisture, neither too much nor too little, the supply port, 6, of the float chamber is controlled by a valve, 7, upon the stem, 8, of which is an adjustable detent or nut, 9, which is adapted to be engaged by a lever arm, 10, the other end of which lever is engaged by a float, 11, whenever the evaporation of the water in the float chamber proceeds beyond a predetermined point, thereby raising the valve, 7, from its seat until enough water has entered the float chamber to raise the float, 11, so as to permit the valve, 7, to again seat. The float chamber is supplied with water by means of a tube, 12, leading from a tank, 13, located at such point as convenience may require.

It will now be seen from the foregoing description, taken in connection with the drawings, that I have provided a simple and effective mechanism for imparting moisture to the air composing a portion of the charge for an internal combustion engine, and for controlling the amount of moisture so imparted.

Having described my invention, what I claim is:

1. Means for moistening the air for an internal combustion engine comprising an air supply tube, a well opening into said supply tube, a wicking or capillary filling for said well, a sleeve telescoping into said supply tube and adapted to close a greater or less portion of the opening into said well, and means for maintaining a constant level of water in said well.

2. Means for moistening the air for an internal combustion engine comprising an air supply tube, a well opening into said supply tube, a sleeve telescoping into said supply tube and adapted to close a greater or less portion of the opening into said well, and means for maintaining a supply of water in said well.

In testimony whereof, I have hereunto set my hand in the presence of two witnesses.

CLYDE S. MUNROE.

Witnesses:
J. L. O'HARA,
BENJ. T. ROODHOUSE.